(12) United States Patent
Musoll et al.

(10) Patent No.: US 12,730,751 B2
(45) Date of Patent: Sep. 8, 2026

(54) METADATA-CACHING INTEGRATED CIRCUIT DEVICE

(71) Applicant: Astera Labs, Inc., Santa Clara, CA (US)

(72) Inventors: Enrique Musoll, San Jose, CA (US); Subbarao Arumilli, Cupertino, CA (US); Anh T. Tran, Elk Grove, CA (US)

(73) Assignee: Astera Labs, Inc., San Jose, CA (US)

( * ) Notice: Subject to any disclaimer, the term of this patent is extended or adjusted under 35 U.S.C. 154(b) by 0 days.

(21) Appl. No.: 18/732,777

(22) Filed: Jun. 4, 2024

(65) Prior Publication Data

US 2025/0370930 A1 Dec. 4, 2025

Related U.S. Application Data

(63) Continuation of application No. 17/884,682, filed on Aug. 10, 2022, now Pat. No. 12,032,479.

(51) Int. Cl.
*G06F 12/0802* (2016.01)

(52) U.S. Cl.
CPC ...... *G06F 12/0802* (2013.01); *G06F 2212/45* (2013.01)

(58) Field of Classification Search
CPC ......................... G06F 12/0802; G06F 2212/45
See application file for complete search history.

(56) References Cited

U.S. PATENT DOCUMENTS 9,921,954 B1 3/2018 Sabbag et al.
10,552,085 B1 2/2020 Chen et al.
10,970,172 B2 * 4/2021 Shani .................... G06F 3/0689
2015/0081981 A1 * 3/2015 McKean ............... G06F 12/123 711/136
2017/0199792 A1 * 7/2017 Hegde ................. G06F 16/2365
2018/0232310 A1 8/2018 Chang et al.
2019/0346904 A1 11/2019 Tannenberger et al.
2021/0271650 A1 * 9/2021 Wang .................... G06F 16/174
2024/0054072 A1 * 2/2024 Musoll ................. G06F 3/0604

FOREIGN PATENT DOCUMENTS

EP 4020239 A1 6/2022
EP 3757860 A1 9/2023

OTHER PUBLICATIONS

World Intellectual Property Organization (WIPO), International Search Report and Written Opinion of International Search Authority (European Patent Office) in International Application No. PCT/US2023/028835, dated Nov. 8, 2023, 11 pages.

* cited by examiner

*Primary Examiner* — Zhuo H Li
(74) *Attorney, Agent, or Firm* — Charles Shemwell

(57) ABSTRACT

A memory control device implements split storage of user-data and metadata components of a compound write data word, outputting the user-data component via a memory control interface for storage within an external memory subsystem while separately storing the metadata component within a metadata cache implemented within the memory control device.

18 Claims, 5 Drawing Sheets

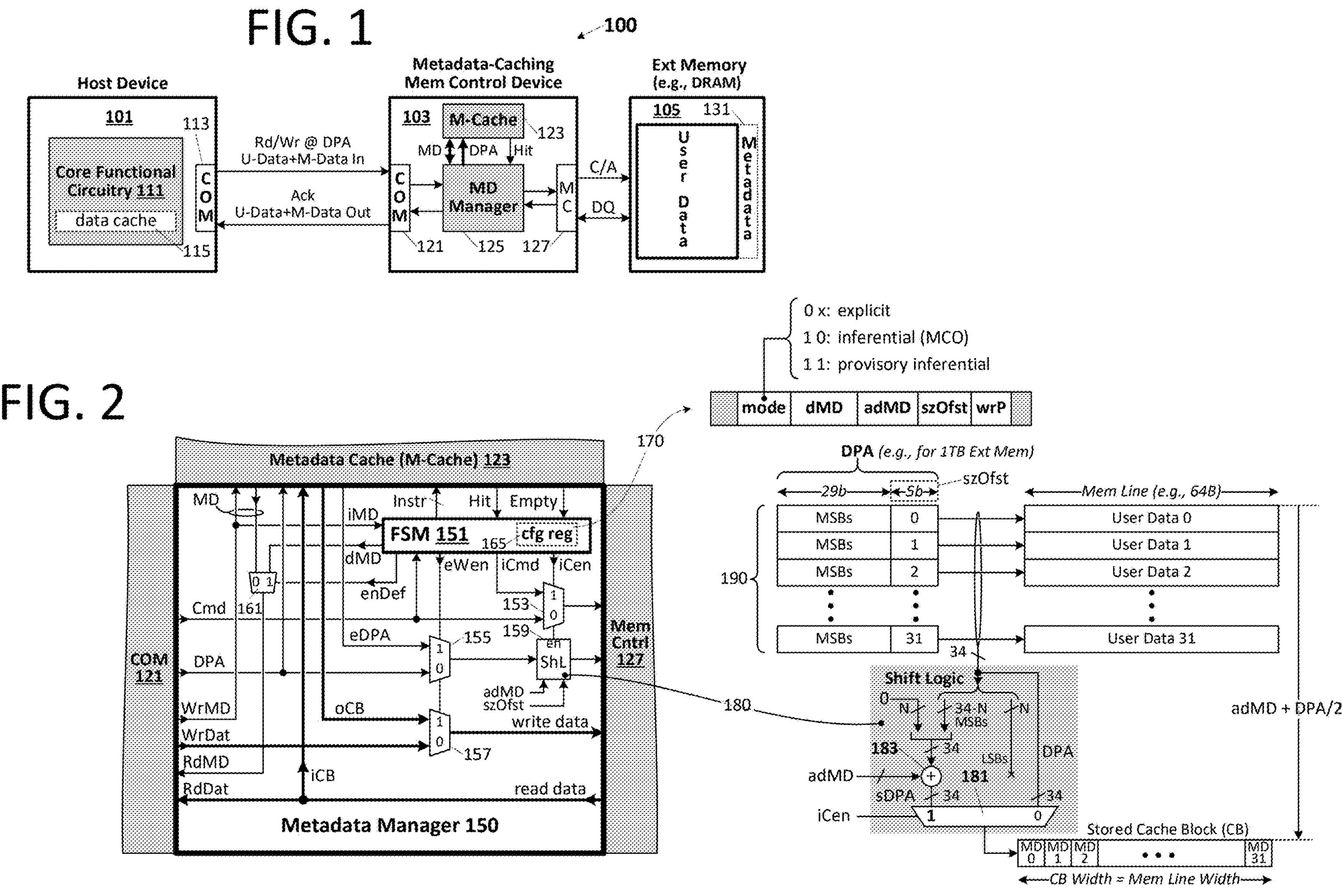

FIG. 1
100
Host Device
101
Core Functional Circuitry 111
data cache
113
115
COM
Rd/Wr @ DPA
U-Data+M-Data In
Ack
U-Data+M-Data Out
Metadata-Caching Mem Control Device
103
M-Cache
123
MD
DPA
Hit
MD Manager
121
125
127
MC
C/A
DQ
Ext Memory (e.g., DRAM)
105
131
User Data
Metadata
FIG. 2
Metadata Cache (M-Cache) 123
MD
iMD
Instr
Hit
Empty
FSM 151
165
cfg reg
dMD
eWen
iCmd
iCen
enDef
Cmd
161
153
eDPA
155
159
en
ShL
COM 121
DPA
Mem Cntrl 127
adMD
szOfst
WrMD
oCB
write data
WrDat
157
RdMD
iCB
RdDat
read data
Metadata Manager 150
170
0 x: explicit
1 0: inferential (MCO)
1 1: provisory inferential
mode
dMD
adMD
szOfst
wrP
DPA (e.g., for 1TB Ext Mem)
29b
5b
szOfst
Mem Line (e.g., 64B)
MSBs
User Data 0
User Data 1
User Data 2
User Data 31
190
34
Shift Logic
180
34-N MSBs
LSBs
183
181
DPA
adMD
sDPA
iCen
adMD + DPA/2^N
Stored Cache Block (CB)
MD 0
MD 1
MD 2
MD 31
CB Width = Mem Line Width MD Manager
Cfg Reg
mode
125
165
mode = explicit
Cmd?
211
Read
Write
search m-cache @ DPA
213
233
m-cache hit?
215
235
Yes
No
return oMD from m-cache
217
empty block?
219
239
evict resident block to ext memory
227
243
load cache block from ext memory (store new tag)
223
extract MD from cache block w/o re-search
225
merge iMD into m-cache block
237
load cache block from ext memory with iMD merge
241
Done

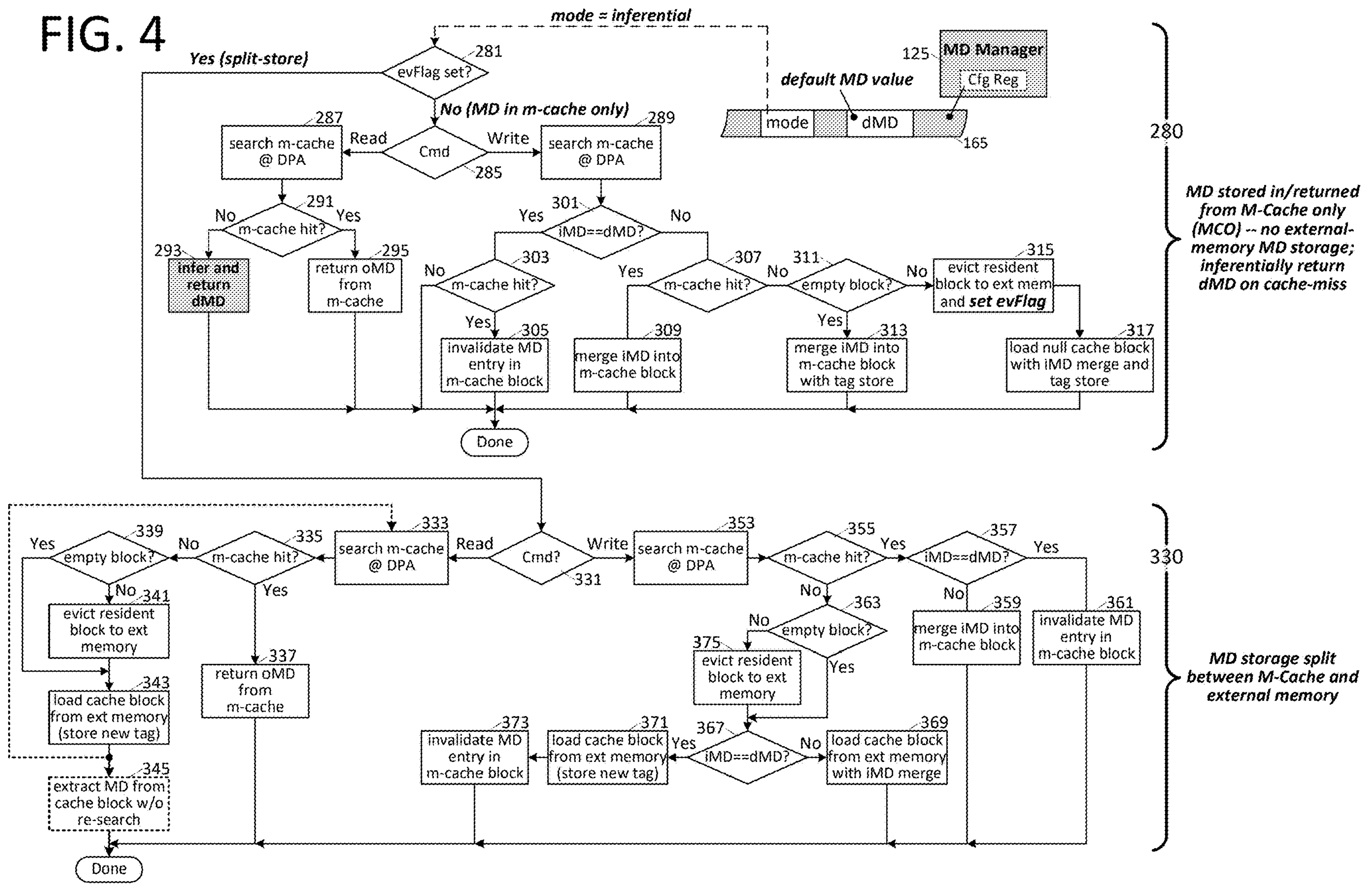
FIG. 4
mode = inferential
Yes (split-store)
281
evFlag set?
No (MD in m-cache only)
125
MD Manager
Cfg Reg
default MD value
mode
dMD
165
280
MD stored in/returned from M-Cache only (MCO) -- no external-memory MD storage; inferentially return dMD on cache-miss
287
search m-cache @ DPA
Read
Cmd
285
Write
289
search m-cache @ DPA
291
m-cache hit?
293
infer and return dMD
295
return oMD from m-cache
301
iMD==dMD?
303
m-cache hit?
305
invalidate MD entry in m-cache block
307
m-cache hit?
309
merge iMD into m-cache block
311
empty block?
313
merge iMD into m-cache block with tag store
315
evict resident block to ext mem and set evFlag
317
load null cache block with iMD merge and tag store
Done
330
MD storage split between M-Cache and external memory
339
empty block?
335
m-cache hit?
333
search m-cache @ DPA
Read
Cmd?
331
Write
353
search m-cache @ DPA
355
m-cache hit?
357
iMD==dMD?
341
evict resident block to ext memory
337
return oMD from m-cache
363
empty block?
359
merge iMD into m-cache block
361
invalidate MD entry in m-cache block
375
evict resident block to ext memory
343
load cache block from ext memory (store new tag)
367
iMD==dMD?
373
invalidate MD entry in m-cache block
371
load cache block from ext memory (store new tag)
369
load cache block from ext memory with iMD merge
345
extract MD from cache block w/o re-search
Done
Yes
No

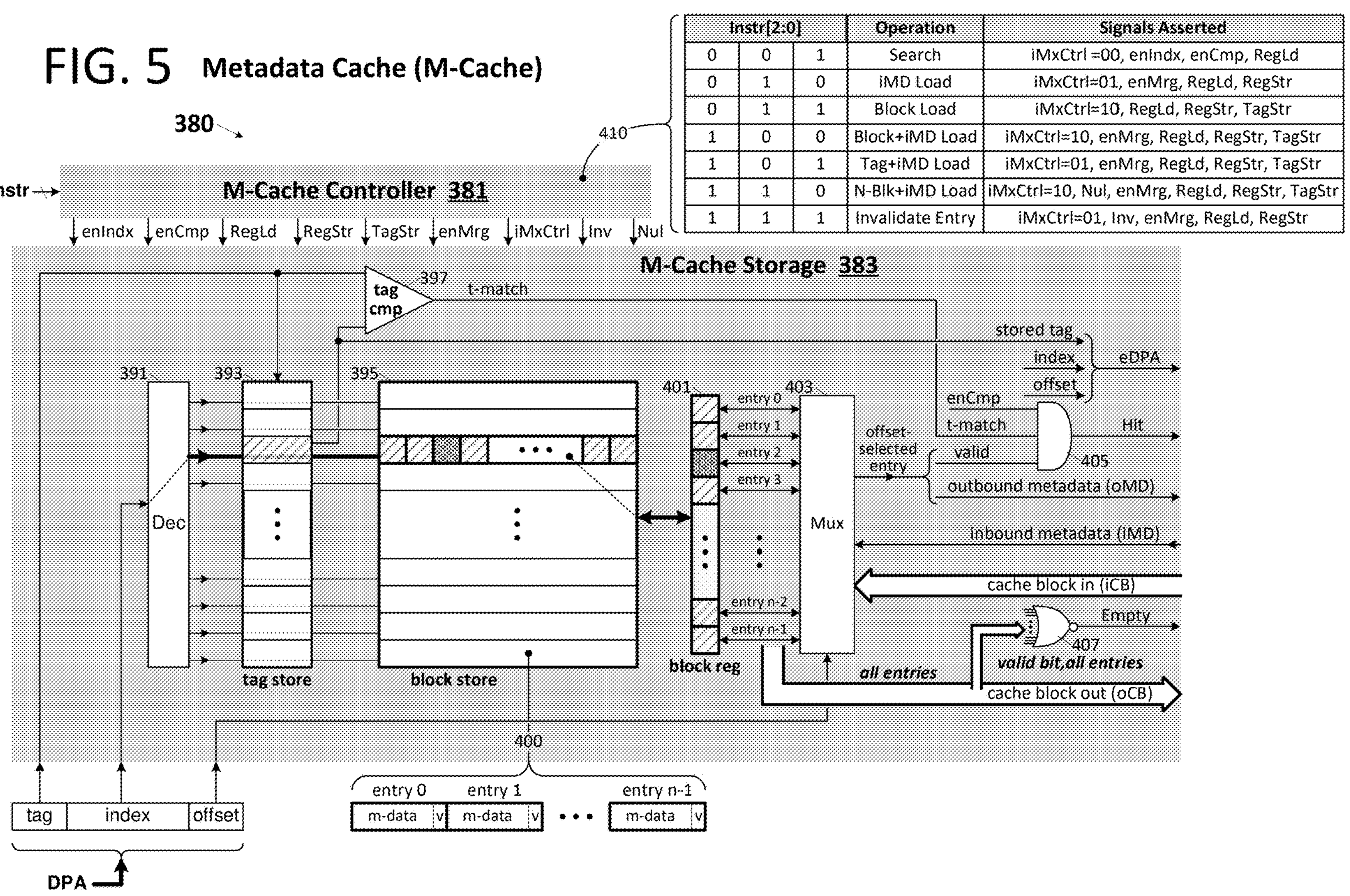
| Instr[2:0] | | | Operation | Signals Asserted |
|---|---|---|---|---|
| 0 | 0 | 1 | Search | iMxCtrl =00, enIndx, enCmp, RegLd |
| 0 | 1 | 0 | iMD Load | iMxCtrl=01, enMrg, RegLd, RegStr |
| 0 | 1 | 1 | Block Load | iMxCtrl=10, RegLd, RegStr, TagStr |
| 1 | 0 | 0 | Block+iMD Load | iMxCtrl=10, enMrg, RegLd, RegStr, TagStr |
| 1 | 0 | 1 | Tag+iMD Load | iMxCtrl=01, enMrg, RegLd, RegStr, TagStr |
| 1 | 1 | 0 | N-Blk+iMD Load | iMxCtrl=10, Nul, enMrg, RegLd, RegStr, TagStr |
| 1 | 1 | 1 | Invalidate Entry | iMxCtrl=01, Inv, enMrg, RegLd, RegStr |

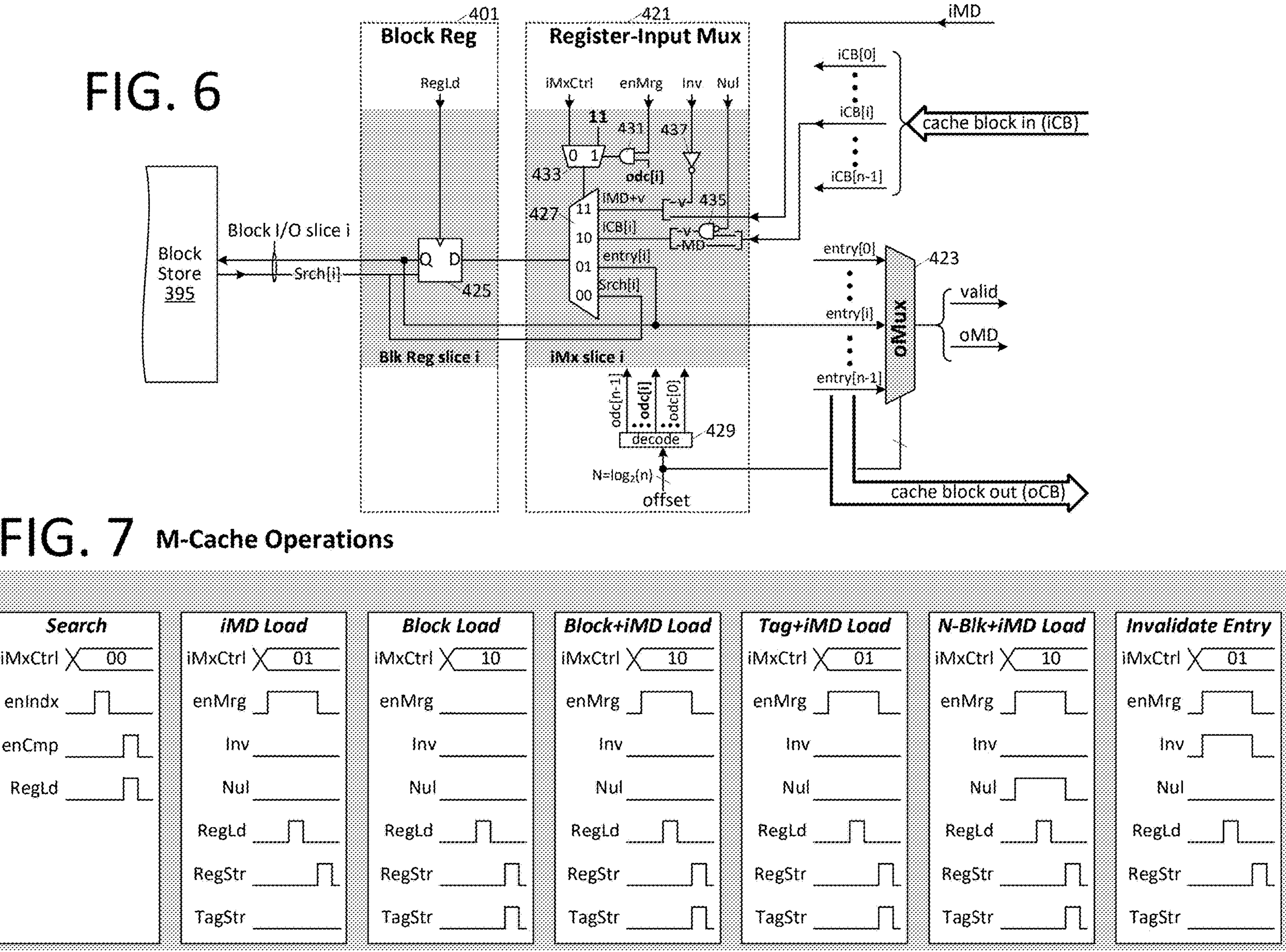
FIG. 6
Block Reg
401
RegLd
Blk Reg slice i
425
Register-Input Mux
421
iMxCtrl
enMrg
Inv
Nul
11
433
431
437
435
427
iMx slice i
iMD+v
iCB[i]
entry[i]
Srch[i]
odc[i]
429
decode
odc[0]
odc[n-1]
N=log2(n)
offset
iMD
cache block in (iCB)
iCB[0]
iCB[i]
iCB[n-1]
oMux
423
valid
oMD
entry[0]
entry[i]
entry[n-1]
cache block out (oCB)
Block I/O slice i
Srch[i]
Block Store 395
FIG. 7 M-Cache Operations
Search
iMxCtrl
00
enIndx
enCmp
RegLd
iMD Load
iMxCtrl
01
enMrg
Inv
Nul
RegLd
RegStr
TagStr
Block Load
iMxCtrl
10
enMrg
Inv
Nul
RegLd
RegStr
TagStr
Block+iMD Load
iMxCtrl
10
enMrg
Inv
Nul
RegLd
RegStr
TagStr
Tag+iMD Load
iMxCtrl
01
enMrg
Inv
Nul
RegLd
RegStr
TagStr
N-Blk+iMD Load
iMxCtrl
10
enMrg
Inv
Nul
RegLd
RegStr
TagStr
Invalidate Entry
iMxCtrl
01
enMrg
Inv
Nul
RegLd
RegStr
TagStr

METADATA-CACHING INTEGRATED CIRCUIT DEVICE

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a data processing system having a host device, metadata-caching memory control device and external memory subsystem;

FIG. 2 illustrates a more detailed embodiment of a metadata manager that may be deployed as the metadata manager shown in FIG. 1;

FIG. 4 illustrates operation of the FIG. 1/FIG. 2 metadata manager in inferential mode in which metadata values matching a default metadata value are un-stored such that, so long as the metadata cache remains the sole metadata storage location, any metadata cache miss enables a deterministic inference that the metadata sought by the host is the default metadata value;

FIG. 5 illustrates an embodiment of a metadata cache capable of executing the search, load and entry-invalidation operations discussed in reference to FIGS. 3 and 4 and that may be deployed as the metadata cache in the FIG. 1/FIG. 2 embodiments;

FIG. 6 illustrates exemplary of the FIG. 5 block register and register-input multiplexer, showing examples of their interconnection to metadata-cache block store and output multiplexer; and FIG. 7 illustrates exemplary control signal diagrams corresponding to the metadata cache operations tabulated in FIG. 5.

DETAILED DESCRIPTION

Figure 3:
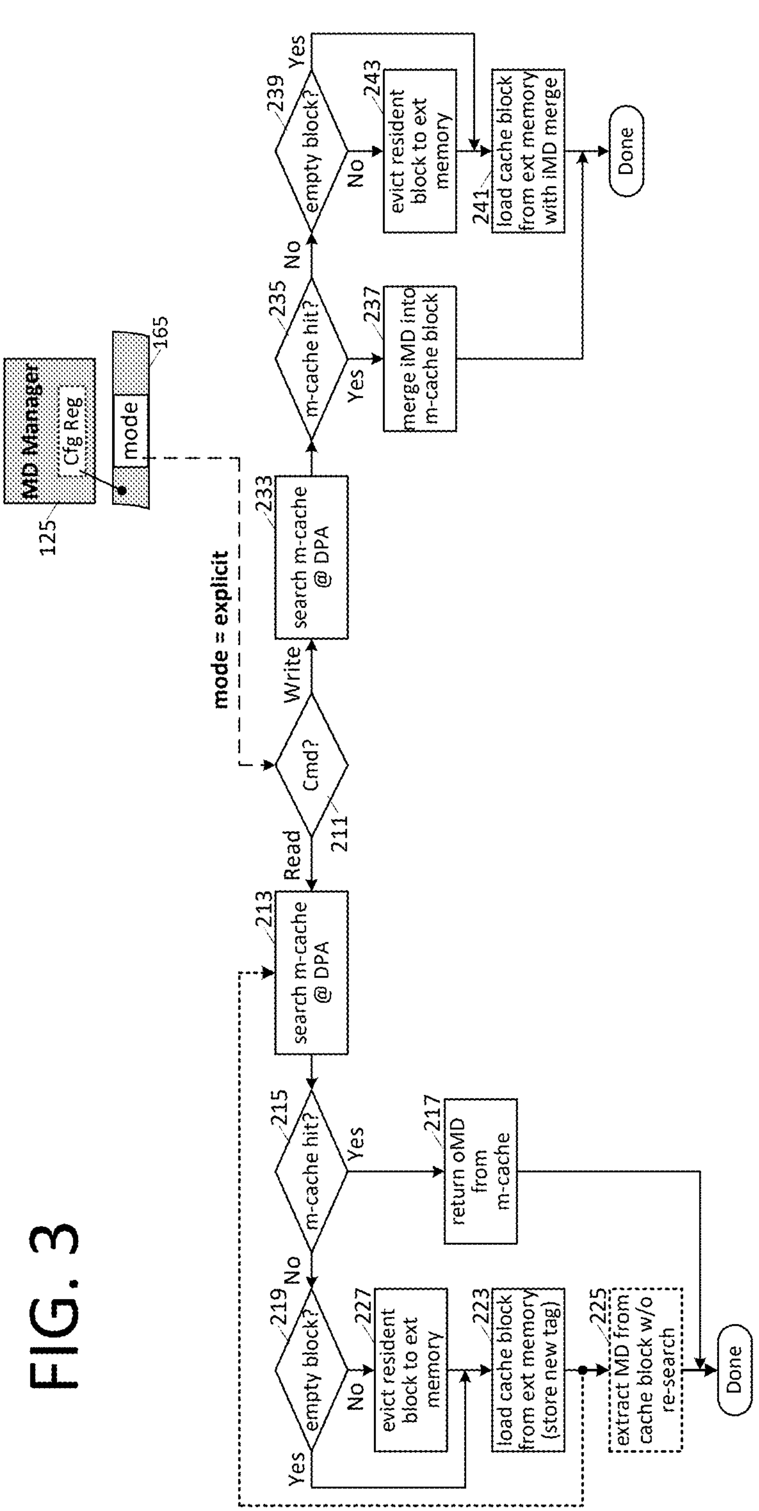
FIG. 3 illustrates an exemplary explicit-store operating mode implemented within the metadata manager and metadata cache shown in FIGS. 1 and 2.

In various embodiments herein, a memory control device effects ramified/split storage of user-data and metadata components of a compound write data word, outputting the user-data component via a memory control interface for storage within an external memory subsystem while separately storing the metadata component within a metadata cache implemented within the memory control device. In a number of embodiments, the user-data component of the write data word matches the native read/write width of the memory control interface so that in situ metadata storage (i.e., within metadata cache) avoids separate write transactions to the external memory system that would otherwise be required to store the user-data and metadata components, reducing external memory utilization by 50% per memory write transaction (and possibly by 66% where storage of a relatively smaller metadata component requires read-modify-write and thus two external memory accesses per metadata write) and correspondingly increasing memory bandwidth availability by 100% (or 200% where read-modify-write transaction to external memory avoided). Memory read transactions are similarly bifurcated, retrieving a metadata component of a compound read data word from the metadata cache and a user-data component of the read data word from external memory (reducing external-memory transaction count by 50% and correspondingly increasing external-memory bandwidth by 100%). In a number of implementations, the metadata cache ("m-cache") is implemented with a block size (read/write width) that matches the user-data component of a read/write data word and is thus capable of storing a number of metadata components corresponding to the ratio between sizes of user-data component and metadata component (i.e., in the predominant case where the user-data component is a factor N larger than the metadata component, each cache block provides storage for N metadata values). Consequently, as the user-data component of a read/write data word is read from or written to external memory, the corresponding metadata value is retrieved (or written) in an operation that reads an entire cache block (and thus multiple metadata values corresponding to respective data words and their user-data components) out of the metadata cache—merging incoming metadata into an address-specified sub-field of that cache-block during a metadata write, and extracting outbound metadata from the address-specified sub-field of that cache-block during metadata read. In such embodiments, multiple entry-valid bits may be stored per cache block (i.e., one per metadata sub-field), with cache hit ascertained not merely by matching of tag and cache-block-index fields of an incoming physical address, but also through selection and evaluation of the entry-valid bit for an offset-specified sub-field of the indexed cache block. In these and other embodiments, a predominant metadata value (i.e., occurring with higher frequency than other metadata values) may constitute a "default" metadata value that is (i) not actually/explicitly stored within the metadata cache and (ii) returned as the metadata component of a read data word in response to metadata-cache miss. Through this inferential/implicit-metadata approach, metadata cache size and search-power consumption may be reduced roughly in proportion to default metadata prevalence rate (e.g., system in which 90% metadata values are the default metadata value will explicitly store 90% fewer metadata values, enabling a metadata cache reduced in capacity/size by 90% to yield the same performance as 10× larger cache a system in which all metadata values are explicitly stored). These and other features and embodiments are discussed in greater detail below.

FIG. 1 illustrates a data processing system 100 having a host device 101, metadata caching memory control device 103 and memory subsystem 105, the latter referred to herein as an "external" memory in view of its discrete implementation with respect to control device 103. In the depicted example, host device 101 includes core functional circuitry 111 (e.g., central processing unit, graphics processing unit, digital signal processing unit, neural net, etc.) together with a communications interface 113 (COM), the former optionally including a data cache 115 that, as discussed below, may impact implementation and/or operational aspects of a metadata cache within control device 103. Communication interface 113 enables physical layer interconnection to counterpart communications interface 121 within control device 103 over which standardized or proprietary communication protocols may be layered including, in a number of embodiments, cache-coherent protocols that support memory read and write semantics (e.g., Compute Express Link (CXL), Gen-Z, Open CAPI, etc.) and require transfer of a specified number of metadata bits with each user-data transfer. That is, host device 101 may issue read and write instructions and corresponding physical addresses to control component 103, with the control component 103, in response, transacting those read and write requests via bifurcated access to an in-situ (e.g., on die or in-package) metadata cache 123 and external memory as discussed above. In the case of CXL and possibly other protocols, host device 101 may issue "host"

physical addresses (HPAs) that are translated/converted to device physical addresses (DPAs) within communications interface 121 (or by other circuitry within metadata-caching memory control device). References herein to incoming DPAs within metadata-caching memory control device 103 may include such HPA-to-DPA translation/conversion when necessary.

The metadata-caching control component includes, together with the aforementioned host-side communications interface 121 and metadata cache 123 ("m-cache"), a metadata management engine 125 ("metadata manager") and memory control interface 127 (MC), the latter coupled to external memory 105 which, for purposes of example herein is assumed to be dynamic random access memory (DRAM) accessible via a command/address signaling path (CA) and bidirectional data path (DQ). In general the data path coupled between memory control interface 127 and external memory 105 has a bit-width that matches the width of the user-data component of a write data word/read data word received from/returned to host device 101 (or vice-versa) and may itself be coupled to multiple discrete memory components (e.g., discrete DRAM packages disposed on a dual inline memory module (DIMM) and coupled to respective slices of the DQ path), accompanied by strobe and/or other timing signal lines, include data-masking controls and so forth. More generally, external memory 105 may be implemented in or with numerous different form-factors, interconnect topologies, core storage technologies (e.g., Flash or various other nonvolatile memory technologies, static random access memory (SRAM), etc. in any combination, including hybrid combinations that include DRAM), access protocols, etc. and may be, in some instances, integrated in a multi-chip package with the metadata-caching memory control device 103. Further, while "external" memory as shown at 105 of FIG. 1 is referenced in various examples/embodiments discussed below, in all cases memory control interface 127 (or other memory interface circuitry) may provide control/access to an internal memory instead of or in addition to external memory 105—for example, a relatively large memory (e.g., SRAM having a storage capacity 2×, 4×, 8×, 16×, 32×, 100×, 1000×, 10,000×, 100,000× or more than that of m-cache 123) implemented on same IC die or within the same multi-IC package as control device 103.

Still referring to FIG. 1, read/write requests issued by host device 101 are accompanied by a device physical address (DPA) that specifies a physical address to be accessed (for data retrieval or storage) within external memory and also, in the case of a memory write request, by a compound or composite write data word having aforementioned user-data and metadata components—inbound user data word and corresponding inbound metadata. In the depicted example, control component 103 responds to memory read requests by executing bifurcated, concurrent (at least partly overlapping in time) metadata and user-data retrieval operations, issuing a memory read command via memory-control interface 127 to retrieve the user-data component from external memory 105 and issuing a cache-search command (supplying the DPA therewith) to metadata cache 123 to ascertain whether the requested metadata value is stored therein and, if so, retrieve the metadata component from the cache (avoiding resort to external memory and thus saving power/memory bandwidth and, in some embodiments, the need to reserve a portion of the memory capacity for metadata storage). More specifically, metadata cache 123 responds to a search instruction from metadata manager 125 by returning a cache hit/miss signal ("Hit") according to whether the DPA indexes to a valid metadata entry (i.e., hit signal asserted if valid entry, deasserted if not), outputting the metadata value to MD manager if so (i.e. metadata input/output shown in FIG. 1 as "MD"). The metadata manger responds to an m-cache hit (hit signal asserted) by returning the cache-supplied metadata value to the host component in combination with the user data retrieved from external memory—the metadata and user data forming respective components of the compound or composite read data word returned to the host (i.e., shown in the host-destined COM path as "U-Data+M-Data Out")—buffering/queueing metadata as necessary to await return of corresponding read data from external memory so that the two data components may be returned as a combined or at least temporally-unified data output word. In alternative embodiments, either data component (metadata or user data) may be returned to the host upon availability with the other component returned at a later time (e.g., returning metadata to host while user-data retrieval from external memory 105 or other storage is ongoing).

Control component 103 responds to host data-write requests through similar bifurcated actions-storing the metadata component of the incoming write data word ("M-Data In") in metadata cache 123 and the user-data component ("U-Data In") in external memory. In a number of embodiments, metadata storage within m-cache 123 commences with the same search operation as metadata readout—supplying the host-issued DPA to m-cache 123 together with a search instruction to determine whether m-cache 123 already contains a valid entry corresponding to the DPA, overwriting that entry if so (m-cache hit), and undertaking one of various optional actions if not (m-cache miss), including creating a new entry within the m-cache in which the inbound metadata value is directly stored and, in some cases, retrieving a cache block entry corresponding to the DPA from external memory and storing the inbound metadata value in the m-cache as part of a cache-block load.

In a number of embodiments, the metadata cache serves as the only/solitary metadata storage—all metadata read/write requests issued to control device 103 are fulfilled exclusively by the metadata cache with no metadata storage in external memory. In some cases, such m-cache-only (MCO) metadata storage is ensured by sizing the m-cache to provide a dedicated metadata storage location for each user-data location (memory line address) within external memory (i.e., distinct m-cache metadata entry per valid DPA). In other embodiments, particularly where metadata is used to ensure coherency between a host data cache (e.g., as shown at 115) and data stored within external memory 105, MCO operation may be ensured by sizing the metadata cache to include a distinct m-cache entry for each user data entry within the host cache—an arrangement in which host cache eviction will occur before eviction-triggering conflict within m-cache 123, thus ensuring that no m-cache eviction will take place and deterministically enabling metadata storage solely within the metadata cache. In other embodiments, m-cache capacity is insufficient to meet worst-case metadata storage demand (i.e., cannot serve as sole metadata repository) so that m-cache conflicts may occur (i.e., attempt to store metadata at a DPA-indexed cache location occupied by metadata corresponding to a different DPA) and require metadata eviction from m-cache to external memory. In such embodiments, a portion of the external memory address space may be reserved for metadata storage (e.g., sufficient to accommodate worst-case/maximum metadata storage) as shown at 131.

FIG. 2 illustrates a more detailed embodiment of a metadata manager 150 (i.e., that may be deployed as metadata manager 125 of FIG. 1) having a finite state machine 151 together with memory-facing command, address and data multiplexers (153, 155, 157, respectively), address-shifting logic 159 and outbound metadata multiplexer 161. MD manager 150 receives host-supplied commands ("Cmd") and memory addresses (device physical addresses, DPAs) via host communication interface 121, receiving write data words and returning read data words via that same interface. More specifically, as user and metadata components of a write data word (WrDat, WrMD) arrive via the host interface in association with a host-issued write command, the metadata component and DPA are forwarded to metadata cache 123 while the user-data component and DPA are forwarded, via data and address multiplexers 157 and 155 (and address shift logic 159) to external memory via memory control interface 127. The incoming write command is supplied to both finite state machine 151 and memory control interface 127 (to the latter via command multiplexer 153), with the memory-control interface responsively issuing a corresponding write instruction to the external memory subsystem (together with the DPA) and forwarding the user data component of the write data word therewith (e.g., with specified timing, issuing control and timing signals as necessary to effect user data transfer and storage).

State machine 151, which may alternatively be implemented by a sequencer, processor or any other practicable control circuitry, responds to the incoming write command by initiating a DPA search within m-cache 123 and more specifically by issuing a search instruction via instruction path "Instr". If a cache hit results (hit signal asserted by m-cache 123), state machine 151 instructs the m-cache (issuing instruction signals thereto) to merge the inbound metadata value (WrMD) into the DPA-indexed cache block, storing the inbound metadata value within a sub-field of the cache-block corresponding to offset bits of the DPA. If a cache-miss occurs, state machine 151 either executes a cache-block load operation (i.e., retrieving a block of data from external memory containing the metadata entries corresponding to the DPA and loading that block of metadata entries into m-cache 123) or, if the m-cache indicates that the DPA-indexed cache-block is empty (i.e., "Empty" signal asserted), instructs the m-cache to merge the inbound metadata value into the empty cache-block (i.e., no load from external memory).

In the FIG. 2 embodiment, each m-cache search operation yields, together with aforementioned hit and miss signals, an outbound cache block (oCB) containing all metadata entries (any or all of which may or may not include valid metadata) corresponding to the index and tag fields of the DPA. Accordingly, an m-cache miss with respect to a non-empty cache-block (hit and empty signals both deasserted following m-cache search) indicates that the outbound cache block includes at least one valid metadata entry. In that case, to avoid loss of that valid cache-resident metadata upon cache-block load, state machine 151 stores the outbound cache block within external memory, effecting an evict operation (evicting the resident cache block to external memory) to make ready for subsequent loading of a cache block corresponding to the host-supplied DPA. More specifically, FSM 151 asserts an internal-command enable signal (iCen) to route an FSM-supplied memory write command to memory controller interface 127 via command multiplexer 153 and also asserts an evict-write enable signal (eWen) to route (i) an m-cache supplied physical address (evict-DPA or "eDPA") to the memory controller interface via address multiplexer 155 and (ii) the outbound cache block (from m-cache 123) to the memory controller interface via data multiplexer 157. As discussed below, the internal-command-enable signal also serves to enable address shift logic 159 to produce an address that indexes into metadata-reserved address space within external memory—for example, an address shifted relative to the eDPA by a pointer into the metadata address space and relative sizing of the user-data and metadata components of host-issued write data words. Memory controller interface 127 responds to the FSM-sourced write command by executing a memory write operation to store the outbound cache block within external memory at a location corresponding to the eDPA as modified by address shift logic 159 (e.g., at a fixed offset from the eDPA indexed memory location according to metadata address pointer, adMD). Thereafter, FSM 151 deasserts the evict-write enable signal while continuing to assert iCen and outputs a read command to the memory controller interface (i.e., via multiplexer) while the DPA supplied within the host-supplied write command is passed to the memory controller interface via multiplexer 155 and iCen-enabled address-shift logic 159, thus providing a command and address to retrieve the cache-block corresponding to the host-supplied DPA from external memory. As shown, the retrieved cache block (arriving via the read data path from memory controller interface 127) is routed to the metadata cache as an inbound cache block (iCB). Accordingly, a predetermined time after initiating retrieval of the inbound cache block from external memory (i.e., according to the memory read latency), FSM 151 issues instruction signals to load the inbound cache block into metadata cache 123 at the host-supplied DPA, storing any tag component of the DPA within the m-cache in association with the newly loaded cache block. While not specifically shown, metadata manager may include various storage elements to store address values, metadata values, etc., as necessary to ensure data/address availability for block load, metadata storage and other operations without disrupting otherwise pipelined memory and m-cache access operations.

Continuing with FIG. 2, FSM 151 also initiates an m-cache search in response to a host-issued memory read command. An m-cache hit is accompanied by m-cache provision of the metadata value corresponding to the host-supplied DPA (the cache-supplied metadata value being referred to herein as an outbound metadata value, oMD), with that metadata value being returned to the host (RdMD) together with the user data retrieved from external memory (RdDat)—the metadata and user data collectively forming the read data word with the metadata buffered as necessary to accommodate external-memory read latency and thus enable simultaneous and/or packet-unified transmission of the read data word to the host via communications interface 121). If the DPA supplied with a host read command misses the m-cache (hit signal deasserted) and indexes to an empty cache block (empty signal asserted), FSM 151 executes a cache-block load as in the metadata write case, either extracting the metadata of interest (i.e., requested by the host) from the inbound cache block (as it is returned from external memory) or re-searching the m-cache after the inbound cache block has been loaded therein, the latter to deterministically yield a cache hit and valid outbound metadata (the latter constituting the metadata of interest). If the m-cache miss is accompanied by an occupied cache-block signal (i.e., m-cache deasserts hit signal, deasserts empty signal), then the FSM may carry out the evict-write operation discussed above to store the resident m-cache block (i.e.

oCB) within external memory before loading the DPA-specified cache block into the m-cache.

As mentioned above, a high-prevalence default metadata value ("dMD") may optionally be un-stored, with m-cache miss implying that the searched-for metadata value is in fact the default metadata value (i.e., presuming that the host issues a write to an address before reading from that same address). More specifically, assuming an embodiment/configuration in which (i) metadata is stored solely within the m-cache and (ii) only metadata values other than a high-prevalence default metadata value are explicitly stored (i.e., storage of infrequently-occurring metadata values but no storage of the higher frequency default metadata value), then a host-issued memory read will result in an m-cache hit for the infrequent metadata values and a cache-miss for the default metadata value. That is, a metadata cache miss implies that the metadata sought by the host is the default metadata value. Accordingly, in such embodiment/configuration, FSM 151 responds to an m-cache-miss by asserting an enable-default signal ("enDef") to return, via oMD multiplexer 161, a default metadata value (e.g., dMD value programmed within a configuration register 165) to the host requestor instead of the outbound metadata value from the cache. Conversely, FSM 151 deasserts enDef in response to a cache hit to return the cached metadata value (oMD) to the host. In response to a host-issued write command, the FSM similarly searches the m-cache to ascertain whether an infrequent metadata value has been explicitly stored (cache hit) and, if so, either overwrites that infrequent metadata value or invalidates the metadata entry according to whether the inbound metadata value is an infrequent metadata value or the default metadata value—operations discussed in greater detail below. Where cache-block eviction occurs (meaning that m-cache-only metadata storage may no longer be presumed), FSM may revert to explicit storage of default metadata values within the m-cache and/or external memory (i.e., the latter in the case of evicted cache blocks). Such operation is discussed in further detail below.

In the FIG. 2 embodiment, configuration register 165 includes various programmable fields including, for example and without limitation, a mode field to enable one of various operating modes, the aforementioned default metadata field to store a host-specified default metadata value (dMD), a metadata address/pointer field to establish a host-defined metadata address space within external memory (as needed), an offset-size field to specify the number (count of) metadata values per cache block and, effectively, metadata size (number of constituent bits), and a write-policy field to enable programmable cache-write policy (e.g., write-back, write-through, etc.). In one implementation, shown for example in detail view 170, the mode field is a multi-bit field that enables specification of any of at least the following operating modes within the metadata-caching memory control device of FIG. 1:

- explicit: all metadata values are explicitly stored within the m-cache and, when necessitated by m-cache conflict, external memory;
- inferential: metadata values matching the programmed (or fixed) dMD are un-stored and, while the metadata cache is the sole metadata repository, inferred on cache-miss; all other "infrequent" metadata values are explicitly stored within the metadata cache and, when necessitated by m-cache conflict, within external memory;
- provisory inferential: same as inferential mode (no dMD storage) until m-cache conflict/overflow requires metadata storage within external memory, transitioning at that point to explicit mode in which all metadata values are explicitly stored, including dMD.

In the FIG. 2 example, the programmable metadata address and programmable offset-size fields within configuration register 165 (i.e. adMD and szOfst, respectively) are selectively applied within address shift logic 159 to generate an address-shifted DPA that indexes a metadata address space within external memory. In one embodiment, shown in detail view 180, the offset size field (szOfst) specifies the number of DPA offset bits (N) required to resolve individual metadata entries within a cache block (thereby specifying the number of metadata entries per cache block as $2^N$), with the cache block size itself either established by a separately programmed value or fixed by system design. As shown, when FSM 151 asserts the internal-command enable signal (iCen), multiplexer 181 selects an address-shifted instance of the DPA (i.e., DPA right-shifted by N-bits) to which the programmed metadata address is added (e.g., within summation circuit 183 (which could be a most-significant-bit concatenation instead of explicit adding circuitry)) to form a cache-block storage address within external memory—a shifted DPA (sDPA) offset from the DPA by adMD+DPA/$2^N$ (integer division) as shown. Taking the example of a 1 terabyte (TB) external memory having a 512-bit (64-byte) data I/O width (i.e., user-data size=memory line size=m-cache block size=64B) and thus a 34-bit physical address (least significant 6 bits of a 40-bit byte-resolution-address unused in view of 64-byte memory line size) and a 16-bit metadata size, then each 64B m-cache block will store 32 metadata values corresponding to DPAs having the same 29 most significant bits and respective ones of the 32 different 5-bit offsets (5 least significant bits of DPA). The association between such DPAs and 32 respective user data values (32 DPAs each having a unique 5-bit offset and same 29 MSBs) is shown at 190, with each such DPA yielding, within address shift logic 159 in response to iCen assertion, a shifted physical address (sDPA) to a cache block storage location within external memory for storage of 32 metadata values corresponding to the 32 user data values. An example of such stored cache-block (CB), containing 32 metadata entries (MD0, MD1, . . . MD31) per the exemplary 5-bit offset-field size is shown at 191. While the foregoing example—1 TB external memory space with 64B memory line size, 64B cache block size, 16-bit metadata size—is carried forward in embodiments discussed below, in all cases, the external memory size, metadata storage address calculation (and implementing circuitry), memory line size, etc. may vary, with any or all such parameters being programmed (e.g., as explicitly shown for szOfst and adMD) within one or more configuration registers of the metadata caching memory control device shown in FIG. 1.

FIG. 3 illustrates an exemplary explicit-store operating mode implemented within the metadata manager and metadata cache shown in FIGS. 1 and 2—that is, an operating mode in which all metadata values are explicitly stored either within the metadata cache or, if necessary, within external memory. Upon receiving a read command at 211, metadata manager (shown at 125 together with configuration register 165) initiates an m-cache search at 213 to determine whether a metadata value has been cached for the incoming DPA. If so (cache-hit signal asserted at 215), the metadata value outbound from the m-cache (i.e., oMD) is returned to the host requestor at 217 together with the user data value read back from external memory. As discussed, the metadata manager may buffer the oMD value as necessary to effect simultaneous return of the metadata and user-data components of a returned data word to the host.

If the search at 213 yields an m-cache miss (negative determination at 215) and the m-cache indicates that the indexed cache block is empty (affirmative determination at 219), the metadata manager retrieves a cache block from external memory (e.g., within the address space indexed via the shifted DPA as discussed above) and loads the cache block into the metadata cache, storing a new tag field component of the DPA within the cache (collective "block load" operation shown at 223). In one embodiment, the metadata manager extracts the metadata from the retrieved cache block prior to (or concurrently with) loading the cache block into the m-cache as shown at 225, returning that extracted metadata value to the host (together with user data retrieved from external memory) without re-searching the metadata cache. In other embodiments, the metadata manager may instead re-search the m-cache after cache-block load (i.e., process flow looping back to cache search 213), deterministically yielding a cache hit at 215 and oMD return at 217.

If the m-cache signals both a cache-miss and that the DPA-indexed cache block is not empty (i.e., negative determinations at 215 and 219), the metadata manager evicts the DPA-indexed cache block (the resident cache block) at 227, writing the resident cache block to external memory at an eviction address formed by concatenating the index field of the host-supplied DPA with the m-cache-stored tag field for the resident cache block (and, at least in an embodiment according to FIG. 2, shifting that eviction-DPA within address-shift logic according to offset field size (szOfst) and metadata storage pointer (adMD)). After cache-block eviction at 227, the cache-block load at 223 is executed with either MD extraction at 225 (without m-cache re-search) or m-cache research at 213 (and then deterministic cache-hit at 215 and oMD return at 217).

Continuing with the explicit-store operating mode shown in FIG. 3, the metadata manager responds to a host-issued write command by initiating an m-cache search at the DPA (233) and, in response to a cache-hit (affirmative at 235), merges the inbound metadata value (iMD)—arriving together with a user data component of a write data word—into the indexed m-cache block at 237, storing the updated cache block within the m-cache. If a cache-miss occurs (negative determination at 235) and the DPA-indexed cache-block is empty (affirmative determination at 239), the metadata manager executes an iMD-merged cache-block load at 241—loading a cache block from external memory generally as discussed in reference to operation 223, but in this metadata-write case merging the iMD with the retrieved cache block before loading into the m-cache (and also updating the tag field according to the incoming DPA as in the block-load at 223). If a cache-miss occurs with respect to an occupied/non-empty cache block (i.e., DPA-indexed cache block contains at least one valid metadata entry, yielding a negative determination at 239), the metadata manager evicts the resident cache block to external memory at 243 (operation as discussed in reference to 227) and then executes the iMD-merged cache-block load at 241.

In the FIG. 3 example, the iMD merge operations at 237 (after cache-hit) and 241 (after cache-miss) constitute m-cache write operations that are subject to a programmable write policy—programmed, for example, within the wrP field of the FIG. 2 configuration register (see FIG. 2 detail view 170) and generally including at least write-through and write-back options. Under a write-back policy setting, the subject cache block is updated within the metadata cache (i.e., to include the incoming metadata value) while update to the corresponding cache-block within external memory is deferred (e.g., until an eviction or other event requiring restored coherency between the backing-store in external memory and metadata cache), rendering the external-memory instance of the cache block stale and the m-cache instance of the cache-block "dirty" (as in modified relative to the external-memory instance). This loss of coherency between the cached and external-memory-stored cache-block instances is eventually resolved, for example, when the m-cache instance of the cache block is evicted.

Under a write-through policy, the metadata manager writes incoming metadata value to both the metadata cache and external memory in response to the same host-issued write command. In the case of a single-channel memory system (i.e., single command/address stream from memory controller to memory subsystem and single corresponding data path), the metadata manager may execute cache-block write-through to external memory after completing bifurcated storage of the user-data and metadata components of the host-supplied write data word (i.e., storage of user data in external memory and metadata in m-cache) or even defer such write-through until an unused data access timeslot is detected (i.e., so as not to encumber ongoing host read/write requests). In a multi-channel memory subsystem, metadata write-through may be executed via one memory channel simultaneously or at least concurrently (at least partly overlapping in time) with respect to user data write via another memory channel.

FIG. 4 illustrates operation of the FIG. 1/FIG. 2 metadata manager in inferential mode—that is, not explicitly storing metadata values matching a pre-programmed (or otherwise predetermined) default metadata value such that, so long as the m-cache remains the sole metadata storage location, any metadata cache miss implies (i.e., enables deterministic inference or deterministically indicates) that the metadata sought by the host is the default metadata value. As discussed above, where m-cache-only operation (i.e., m-cache is sole metadata storage) is ensured through system design and/or sheer size of the m-cache, no eviction to external memory will occur or need be provided for. In the more general case in which m-cache-only operation cannot be ensured in all cases—i.e., an incoming DPA may possibly resolve to m-cache location(s) already occupied by non-empty cache block(s) corresponding to different DPA(s)—the metadata manager may at some point evict a cache block to external memory and thus create two independent possibilities for any subsequent m-cache miss: (i) that the metadata being sought is the default metadata value and thus not stored in the m-cache or (ii) that the metadata sought (default value or not) resides in a cache block evicted to external memory. Accordingly, after eviction occurs and so long as an m-cache block containing at least one valid metadata entry remains in external memory, the presumption that an m-cache miss implies a default metadata value no longer holds, requiring, in at least some embodiments, cache-block loading on m-cache miss and thus a generally different operating flow than in the pre-eviction, m-cache only (m-cache as sole storage) state. In the generalized embodiment of FIG. 4, the metadata manager maintains a state variable referred to herein as the evict-flag (evFlag) to indicate whether eviction has occurred and thus to signal whether metadata is stored solely in the m-cache (enabling m-cache-only (MCO) inference/presumption of default metadata on m-cache miss) or stored in both the m-cache and external memory (split-store). In a number of embodiments, one or more background processes may be executed by the metadata manager or host processor to track cache blocks evicted to external memory, returning those cache-blocks to the metadata cache (and/or restoring metadata values within evicted cache blocks to the default metadata value) when conditions permit, and thus eventually clearing all cache-blocks from the external memory and enabling the evict-flag to be reset (restoring MCO operating mode). In a more specific example, a direct-memory-access engine (e.g., implemented through software execution) may perform background restoration of evicted-block metadata values to the default value, resetting the evict-flag when no non-default-valued metadata remains in external memory.

At system startup (and/or soft reset, etc.), the evict flag is reset such that any incoming read or write command is subject to the m-cache-only operating flow shown generally at 281. More specifically, the evFlag evaluation at 281 yields a negative determination, so that the read or write command (branch at 285) triggers an m-cache search at 287 or 289 respectively. In the metadata-read flow, a cache-miss (negative determination at 291) implies an un-stored default metadata value (dMD) with that default value, dMD, being returned to the host requestor at 293. In the FIG. 2 embodiment, for example, metadata manager 150 asserts the enable-default signal (enDef) to pass the default-metadata value (e.g., sourced by a pre-programmed field within configuration register 165) onto the RdMD path for return to the host via oMD multiplexer 161. Returning to FIG. 4, if an m-cache hit occurs following the search at 287 (affirmative determination at 291 which occurs only for non-default "infrequent" metadata values), the outbound metadata (oMD) from the m-cache is returned to the host (i.e., metadata manager deasserts enDef in FIG. 2 embodiment).

Still referring to FIG. 4 MCO operation (generally at 280), metadata write following the m-cache search at 289 is split according to whether the inbound metadata value (iMD) matches the default metadata value. If iMD matches the default value (affirmative determination at 301), and no m-cache hit occurred (negative at 303), then no further action is required as default-valued iMD is un-stored within the m-cache. If an m-cache hit occurs with respect to the DPA supplied with the default-valued iMD (i.e., affirmative branch at 303), then a non-default metadata value was previously stored within the m-cache for the DPA. In that case, the metadata manager instructs the m-cache to invalidate that previously stored metadata entry at 305, thus reverting to an implied instance of the default meta-data for the invalidated entry by ensuring an m-cache miss in response to future search at that DPA. If the inbound metadata value does not match the dMD, then a cache hit (affirmative at 307) triggers iMD merge into the m-cache block at 309 (as described with respect to iMD-load operation 237 in FIG. 3), and a cache-miss (negative branch at 307) with respect to an empty cache block (affirmative determination at 311) similarly triggers iMD merge into the empty m-cache block (rendering the cache block non-empty) with the added action of storing the tag field of the DPA (i.e., an iMD+tag load operation as shown at 313), thus ensuring a cache-hit for the subject DPA in any downstream m-cache search.

An MCO-mode non-default-metadata write operation yielding an m-cache-miss on a non-empty block (negative determinations at 301, 307 and 311), constitutes an eviction-triggering conflict. In that case, which may never arise in some m-cache implementations and applications, the metadata manager evicts the resident cache-block to external memory at 315 (e.g., eviction implemented as discussed with respect to operations 227 and 243 of FIG. 3) and sets the evict flag to reflect the transition from m-cache only (MCO) metadata storage to split metadata storage. Following the eviction at 315, the metadata manager merges the inbound metadata value into a null (empty) cache-block at 317—an iMD-merged null-cache-block load in which a cache block containing the merged inbound metadata value as its only valid entry (i.e., valid bits cleared for all other entries) is stored within the m-cache together with the DPA tag field.

Referring now to the split-storage operation that follows evFlag setting at 315 (i.e., operation shown generally at 330), an incoming read command (Cmd=read at 331) triggers an m-cache search (333), followed by the operations discussed in reference to FIG. 3 for m-cache miss in response to read-triggered search. That is, oMD return (337) in response to m-cache hit (affirmative at 335), or cache-miss-triggered eviction 341 (if non-empty block at 339), block-loading 343, and either metadata extraction 345 from retrieved cache block at 345 or loop-back for m-cache re-search at 333 as shown (i.e., re-search at 333 after cache block load at 343).

Still referring to the split-store operating flow (FIG. 4), when a write-command-triggered m-cache search at 353 yields a cache hit (affirmative determination at 355), the m-cache controller takes one of two actions according to whether the inbound metadata value matches the default value (determination at 357): either merging a non-dMD inbound metadata value into the cache block at 359 or, where iMD=dMD, invalidating the metadata entry within the DPA-indexed cache block (i.e., the metadata entry specified by the DPA offset field) at 361. Staying with the split-store data-write path, in the case of a cache-miss on an empty cache block (negative at 355, affirmative at 363), the m-cache controller again takes alternate actions according to whether the inbound metadata value matches the default value (determination at 367)—loading a cache block from external memory with non-default-valued iMD merge at 369 or, in the default-valued iMD case (affirmative at 367), loading a cache block from external memory (storing a new tag field in the m-cache) at 371 and then invalidating the metadata entry specified by the DPA offset field at 373. Where a split-store write-operation indexes a non-empty block (yielding negative determinations at 355 and 363), the indexed cache block is evicted to external memory at 375 followed by the operations discussed above for the empty-block determination (i.e., either the operation at 369 for non-default-valued iMD, or the operations at 371 and 373 where iMD=dMD.

Still referring to FIG. 4, where a provisory inferential operating mode is programmed within configuration register 165 (i.e., instead of inferential mode), the m-cache manager transitions, after setting the evFlag at 315 and completing the iMD-merged null-block loading at 317, from the inferential operating flow shown at 280 to the explicit-store operation shown in FIG. 3, explicitly storing all metadata values and no longer inferring default-valued metadata in response to cache-miss. Where the host component and/or metadata-caching memory control component provides for evicted cache blocks to be cleared from external memory (e.g., returned to the metadata cache in a background operation or all metadata values within those cache blocks converted/changed to the dMD so that no return to m-cache is needed), the metadata manager may, after all metadata has been evacuated from external memory, auto-transition back to inferential operation, albeit with some cache-stored default metadata values that will eventually be invalidated. Additionally, in all operating flows discussed with respect to FIG. 4, the eviction at 315 may trigger an error reporting operation in which the host (or other system management component) is notified of an impending/unexpected exit from metadata-cache-only operating mode. After such error-reporting, the metadata-caching control device may optionally continue operating according to the split-store flow shown in FIG. 4 and/or, if programmed for provisory-inferential operation, according to the explicit-store flow shown in FIG. 3 (explicitly storing all metadata values). Also, to avoid loading of indeterminate/not-previously-written cache blocks from external memory load during split-store write operation (e.g., at operations 369 and 371 in FIG. 4), external memory reserved for metadata cache block storage (or any portion thereof) may be initialized at system startup or other in response to other event (e.g., transition from MCO mode to split-store mode) with benign or host-defined initial metadata values.

FIG. 5 illustrates an embodiment of a metadata cache 380 capable of executing the search, load and entry-invalidation operations discussed in reference to FIGS. 3 and 4 and that may be deployed as the metadata cache in the FIG. 1/FIG. 2 embodiments. In depicted example, m-cache 380 includes a cache controller 381 and cache storage 383, the former issuing control signals to carry out MD-manager-instructed operations ("Instr") and the latter including an index-field decoder 391, tag store 393, tag comparator 395, block store 397, block register 401, input/output multiplexer circuitry 403 and hit-signal generator 405 and empty-signal generator 407. In one embodiment, the incoming instruction signals encode the superset of operations that may be instructed by the metadata manager within the operational flows of FIGS. 3 and 4, including search, inbound metadata (iMD) load, cache-block load, cache-block load with merged iMD ("Block+iMD Load"), tag-field/iMD load, null-block load with merged iMD and entry invalidation. In applications or embodiments that do not require the operational superset (i.e., a more limited set of operations suffice as in the operational flow of FIG. 3—no entry invalidation or null-block loading or merging of iMD into empty cache block following m-cache miss), hardware/circuit elements provided to execute the unused operations may be omitted. Also, for simplicity of explanation, the m-cache storage is illustrated with one-way set associativity—i.e., direct-mapped with a given index within an incoming DPA resolving to only one stored tag field (one-way) rather than multiple tag fields (multi-way). In alternative embodiments, m-cache 380 may be implemented with multi-way associativity (i.e., n-way associativity, where n>1) or may even be fully associative. More generally, m-cache may be implemented with any practicable cache architecture with operational circuitry/features discussed below varying accordingly.

M-cache controller 381 responds to an incoming cache-search instruction (e.g., operations shown at 213 and 233 in FIG. 3 and at 287, 289, 333 and 353 in FIG. 4), by asserting an enable-index instruction (enIndx) to decode the index field of the incoming DPA within index-decoder 391 and apply the decoded index (one-hot output of decoder 391) to select a tag-field value stored within tag store 393 and a cache block entry within block store 395 (referred to herein as the indexed tag and indexed cache-block, respectively). Tag comparator 397 compares the indexed tag with the tag field of the incoming DPA to determine whether the DPA indexes to a cache block containing to the metadata entry of interest, asserting or deasserting a tag-match signal ("t-match) indicating the comparison result. The indexed cache block—containing 'n' metadata entries each including storage for a respective metadata value and, in some embodiments, a valid bit qualifying the metadata value as shown at 400—is routed to the input of block register 401 via a register-input multiplexer component of multiplexing circuit 403 and is also driven onto the cache-block output path as the outbound cache block (oCB). As shown, valid bits associated with respective metadata entries within the output cache block are supplied to a NOR gate implementation of empty-signal generator 407 to generate the empty signal ("Empty") supplied to the metadata manager (e.g., evaluated in decisions 219, 239 of FIG. 3, and in decisions 311, 339, and 361 of FIG. 4). The m-cache controller asserts a register-load signal (RegLd) to load the oCB into block register 401 which in turn feeds the constituent metadata entries within the registered cache block (i.e., 'n' metadata entries, where $n=2^N$ and N is the szOfst value discussed above) to an output multiplexer component of multiplexer circuitry 403. The output multiplexer outputs the metadata entry specified by the offset field of the incoming DPA as the offset-selected metadata entry, with that entry (like all others within the registered cache block) containing a metadata value and a valid bit, the latter indicating whether the former is valid. Hit signal generator 405 (shown conceptually as a logic AND gate) is enabled by a compare-enable pulse (enCmp) from m-cache controller 381, asserting a cache hit signal ("Hit") in response to a valid metadata indication (valid bit asserted) and matching indexed and DPA tag fields (tag-match signal asserted), and deasserting the Hit signal to indicate a cache miss if either of the valid-bit or tag-match signals is deasserted.

During an inbound metadata (iMD) load operation—for example, as shown at 237 in FIGS. 3 and 309, 359 in FIG. 4, an offset-selected metadata entry within block register 401 is overwritten with the inbound metadata value followed by writing the block register contents back to the DPA indexed block-store location. In one embodiment, cache-controller 381 effects this operation by setting the register-input multiplexer (i.e., multiplexer that controls the source of signals written into the block register) to a hold state ("iMxCtrl=01" as shown in the exemplary instruction/operation table at 410) while also asserting an enable-merge signal (enMrg), the latter to override the hold-state multiplexer setting for the block-register entry corresponding to the offset field of the DPA and thereby enable the iMD to overwrite the content of that specific entry within the block register when the cache controller asserts the RegLd signal. The block register content, now containing the iMD within a DPA-offset-field-specified entry, is then written back to the block store in response to m-cache controller assertion of a register-store signal (RegStr).

M-cache controller 381 effects a cache-block load operation—third entry in table 410 and shown for example at 223 in FIG. 3 and at 343 in FIG. 4—by setting the register-input multiplexer to route the incoming cache block (iCB) to the per-entry inputs of the block register ("iMxCtrl=10"), loading the iCB into the block register by asserting the register-load signal (RegLd) and then asserting register store and tag-store control signals (RegStr, TagStr) to store the contents of the block register (i.e., iCB) within block store 395 and to store the tag field of the host-supplied DPA within tag store 393, respectively. M-cache controller 381 implements a cache-block load with merged inbound metadata load (e.g., as in operations 241 of FIG. 3 and 363 of FIG. 4; fourth entry in table 410) in generally the same manner as the cache-block load, but with additional assertion of the merge-enable signal (enMrg) to store the inbound metadata value within the block register entry specified by the offset field of the host-supplied DPA (i.e., storing the iCB within the block register, but with the offset-specified entry overwritten with iMD, effectively merging the iMD into the iCB as part of the block load). Thereafter the block register content is written back to the block store (asserting RegStr) and the tag field of the DPA is written into the tag store (asserting TagStr) to complete the block load operation.

Joint storage of the DPA tag field and inbound metadata (e.g., as in operation 313 of FIG. 4; fifth entry in table 410) is effected as discussed above for iMD load, with the additional assertion of the tag-store control signal (TagStr) to write the DPA tag field into the tag store. M-cache controller 381 loads an empty/null cache block with merged inbound metadata (e.g., as in post-eviction operation 317 of FIG. 4; sixth entry of table 410) via the same control signal sequence as in the block+iMD load operation but additionally asserting a block-nulling signal (Nul) prior to loading the block register, the nulling signal clearing the valid bits for all metadata entries loaded into the block register (i.e., signifying non-valid entry) except for the entry overwritten by the inbound metadata (i.e., by virtue of the merge-enable signal). Finally, m-cache controller 381 implements the entry invalidation operations shown at 305 and 369 of FIG. 4 in generally the same manner as iMD load with the additional assertion of an invalidate signal (Inv) prior to register load—the invalidate signal serving to clear the valid bit within the block register entry specified by the DPA offset field and thus invalidate that entry. In alternative embodiments the metadata cache may respond to a "flush" instruction from the metadata manager by invalidating content stored within the metadata cache with variable granularity (e.g., invalidating specific metadata entry according to DPA offset field, invalidating content of entire cache block indexed by DPA, invalidating entirety of m-cache content), evicting/writing corresponding m-cache content (including entirety of m-cache content) to external memory. Such cache-flush operations may be executed to effect/support, for example, a null-block load (flush-granularity=cache block), eviction of entire cache contents to external memory, MD entry invalidation (flush-granularity=MD entry), etc. In such embodiments, separate instructions and circuitry for null-block load and entry invalidation may be omitted in favor of circuitry to support the variable-granularity cache-flush operations. Also, while explicit valid-bit storage (i.e., one valid bit per metadata entry stored within m-cache) is shown and described in reference to FIG. 5 and other embodiments discussed herein, metadata validity/invalidity may alternatively be, in all embodiments herein, encoded within the metadata value itself (e.g., host designation/reservation of one of $2^q$ possible metadata values or particular logic state(s) of one or more of q metadata bits as indicating invalidity), obviating separate valid-bit storage within the m-cache. In such embodiments, an explicit valid bit (or set of bits) may be generated or applied as needed within the m-cache, for example, by circuitry that detects the encoded metadata validity/invalidity condition within a given metadata entry and generates a valid bit accordingly for purposes of assessing cache hit/miss, and/or by circuitry that encodes the validity/invalidity state into one or more metadata entries within a cache block for purposes of entry invalidation, null-block load, etc.

FIG. 6 illustrates exemplary slices—corresponding to the width of a single metadata entry within a multi-entry (n-entry) cache block—of the FIG. 5 block register 401 and register-input multiplexer 421, showing exemplary interconnections to block store 395 and an output multiplexer 423 (register-input multiplexer 421 and output multiplexer 423 being constituents of FIG. 5 multiplexer circuitry 403). In the depicted embodiment, the block register slice (slice 'i' to designate register storage for the $i^{th}$ one of n metadata entries within a given m-cache block) is implemented by a flop stage 425 having (i) sufficient storage and I/O width sufficient to store a multi-bit metadata value and corresponding valid bit, (ii) an output (Q) that drives a slice 'i' cache-block content to the input block store 395, and (iii) an input (D) to receive an incoming metadata entry from a source selected by slice 'i' of data-source multiplexer 427, a component of register-input multiplexer 421.

In an m-cache search operation (i.e., triggered by the m-cache controller assertion of index-enable signal, enIndx), each slice (Srch[0], Srch[1], . . . , Srch[i], . . . . Srch[n−1]) of the DPA-indexed cache block is supplied to the '00' port of the corresponding data-source multiplexer slice (FIG. 6 showing only input mux slice 'i'). Accordingly, the m-cache controller stores the indexed cache block within the block register by driving the data-source multiplexer control to '00' (iMxCtrl=00, selecting the '00' data-source port) and then issuing a register-load pulse (asserting and then deasserting RegLd), strobing the indexed cache block into block register 401. This control signal sequence is illustrated in the exemplary waveform diagram marked "Search" in FIG. 7—additionally showing assertion of the compare-enable signal to enable conditional generation of a hit signal (according to states of t-match and entry valid bit) as part of the m-cache search.

Continuing with FIG. 6, the output of each block register slice following m-cache search (i.e., constituting a respective metadata entry and thus storage for a metadata value and corresponding valid bit indicating whether the metadata value is valid) is supplied to a respective input port of output multiplexer 423 with that multiplexer, in turn, outputting an entry according to the N-bit offset field ($N=\log_2(n)$) of the host supplied DPA. The metadata field within the offset-selected block register entry (i.e., output from multiplexer 423) constitutes the outbound metadata value described above (oMD), and the valid bit within that entry corresponds to the valid bit shown in FIG. 5—to be logically ANDed with the tag comparator output to produce a hit/miss signal (with such operation alternatively being performed within the metadata manager). In the depicted embodiment, the complete block register output (i.e., collective outputs from all block-register slices) constitutes the cache block output from the m-cache (oCB) for storage in external memory in an eviction operation.

A metadata load (e.g., as in operation 237 of FIG. 3 and operations 309, 359 of FIG. 4) following search-triggered cache block storage within block register 401 is implemented by overwriting an offset-selected entry of the block register with the inbound metadata value (iMD). More specifically, the m-cache controller asserts the merge-enable signal (enMrg) while setting the data-source mux control to the register-hold state (iMxCtrl='01') so that, upon pulsing the register-load signal, all entries within the block register are maintained (re-loaded) except for the entry corresponding to the DPA offset field. In the depicted example, the offset field of the DPA is supplied to a decoder 429 which generates a one-hot output on n offset-decode lines (odc)—one of the odc lines corresponding to the DPA offset field is activated/asserted, while all others remain deasserted—so that assertion of the merge-enable signal activates (via AND gate 431) a merge multiplexer 433 within the offset-selected input-multiplexer slice, passing iMD-load control value '11' to the control input of data-source multiplexer 427 instead of the '01' register-hold value delivered (from the m-cache controller) to the data-source multiplexers within all other input multiplexer slices. Accordingly, when the m-cache controller pulses the register-load signal, the iMD is loaded into the offset-selected entry within block register 401—stored thereafter within the block register in response to cache-controller assertion of the register-store signal (RegStr). FIG. 7 illustrates an example of this control-signal sequence in an "iMD Load" waveform diagram. Note that, at least in the operational flows of FIGS. 3 and 4, inbound metadata load follows an m-cache hit, meaning that no tag storage is required (hence TagStr control signal deasserted) as the tag field stored within the m-cache tag store has been confirmed to match the tag field of the host-supplied DPA.

In a cache-block load operation (e.g., following a cache-miss and possible eviction operation), the m-cache controller sets the data-source mux control value to pass the inbound cache block (iCB) to the block register (i.e., iMxCtrl='10' in the FIG. 6 example) via respective input-multiplexer slices, asserting the register-load signal thereafter to capture the iCB within the block register and then pulsing the register-store and tag-store signals to store the block register content (iCB) within the block store and the tag field of the incoming DPA within the tag store. An exemplary block-load control signal sequence is shown under the heading "Block Load" in FIG. 7.

A block-load operation merged with inbound metadata (block+iMD load) may be effected generally as in the cache-block load described above, with the m-cache controller additionally asserting the merge-enable signal (e.g., as shown under the heading "Block+iMD Load" in FIG. 7) to load the inbound metadata into a slice of the block register specified by the DPA offset field. A tag field load in combination with storage of inbound metadata (e.g., as in operation 313 of FIG. 4) is implemented with the same signal sequence shown for FIG. 7 iMD Load, except that the m-cache controller additionally asserts the tag store signal (e.g., concurrently with RegStr) as shown in the example captioned "Tag+iMD Load" in FIG. 7.

A null-block load merged with inbound metadata (e.g., operation 317 of FIG. 4) may be implemented by the same signal sequence shown in the FIG. 7 Block+iMD Load, with the m-cache controller additionally asserting a null-block signal (Nul) during the register-load operation. In the exemplary implementation of FIG. 6, the block-null signal is applied to the inverting input of AND gate 435, thereby clearing the valid bit (i.e., to indicate non-valid entry) for all entries loaded into the block register via the inbound cache-block port (i.e., input multiplexer port '10'), while the merge-enable signal enables storage of the inbound metadata value (and valid bit therefore) within the block register slice specified by the DPA offset field. An exemplary null-block/iMD load control signal sequence is shown under the heading "N-Blk+iMD Load" in FIG. 7.

In the embodiments of FIGS. 6 and 7, the m-cache controller implements an entry-invalidation operation (e.g., as shown at 305, 369 in FIG. 4) through issuance of the same signals as in the "iMD Load shown in FIG. 7 with the m-cache controller additionally asserting an entry-invalidate signal (Inv). In the FIG. 6 example, an inverted version of the invalidate signal (i.e., generated by inverter 437) constitutes the valid bit otherwise loaded with the inbound metadata value, so that invalidate signal assertion effectively clears the valid bit associated with the iMD, thereby invalidating that entry. An exemplary entry-invalidation control signal sequence is captioned "Invalidate Entry" in FIG. 7.

While a block-register-based m-cache implementation and operation are described in reference to FIGS. 5-7, block register 401 may be omitted in alternative m-cache embodiments with block load (iCB or null), iMD merge (including entry invalidation) and like operations executed in situ within block store 395 (i.e., no need to read a cache block out of the block store for iMD merge, nullifying, invalidation and/or block-load operations). More generally, as discussed above, the metadata cache (including controller and storage components thereof) may be implemented with any practical architecture including architectures in which the cache block size matches the metadata entry size (rather than the memory-line/user-data size), architectures that maintain per-entry and/or per-cache-block dirty bits (such bits being set to mark modified entry/cache-block contents), architectures that maintain additional status bits (e.g., access counters) that enable one of various programmably selected eviction/replacement policies (e.g., least-recently-used, first-in-first-out, last-in-last-out, most-recently, used, time-aware least-recently used, least frequently used, etc.), and so forth.

Referring to FIGS. 1-7 generally, the above-described metadata-caching memory control device may be implemented within a standalone integrated circuit package (e.g., having one or multiple IC dies) or in one or more discrete IC packages. Conversely, the metadata-caching memory control device may be integrated in a multi-chip package with a host component and/or external memory component. One or more programmed microcontrollers and/or dedicated hardware circuits (e.g., finite state machines, sequencers, registered or combinational circuits, etc.) may implement and/or control all or part of the various architectural and functional elements within the metadata caching memory control device presented herein (e.g., to implement any one or more of the metadata manager (e.g., FSM therein), m-cache controller, etc.). Additionally, any or all of those architectural/functional elements (including the entirety of the metadata-caching memory control device and/or host device having core circuitry for programming/configuring and operating the metadata-caching memory control device) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the expression "user data" is used herein in contradistinction to the metadata component of a compound/composite data word and may include data from virtually any source and/or used by any executing entity (e.g., variable or static data (including program code itself) associated with processor-executed application programs, hardware drivers, operating system code, dynamically linked libraries and so forth). The various widths of user-data components, metadata sizes, external memory storage size, specific numbers of physical address bits and sub-fields thereof, cache-architecture (including level of associativity ranging from direct-mapped to fully-associative), external memory architectures and/or storage technology, singling path widths, cache block sizes, command protocols, and so forth are provided for purposes of example only—any practicable alternatives may be implemented in all cases. Similarly, signaling link parameters, protocols, configurations may be implemented in accordance with any practicable open or proprietary standard and any version of such standard. While the memory subsystem coupled to the metadata-caching memory control device has been described as an "external" memory, such memory subsystem or any part thereof may be implemented on the same die or within the same integrated circuit package (e.g., system-in-package, three-dimensional IC, etc.) as the metadata-caching memory control component. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit memory control component comprising:
- a memory interface to receive host data from one or more memory ICs in a memory read operation;
- control circuitry to recover a first metadata value that corresponds to the host data, including circuitry to:
  - search a metadata cache for the first metadata value,
  - retrieve the first metadata value from the metadata cache in response to a metadata cache hit, and
  - assign a default metadata value to be the first metadata value in response to a metadata cache miss;
- a host interface to output the host data and the first metadata value to a host component after receiving the host data from the one or more memory ICs and recovering the first metadata value; and
- a programmable register to store the default metadata value, and wherein the circuitry to assign the default metadata value to be the first metadata value comprises circuitry to obtaining the default metadata value from the programmable register.

2. The integrated-circuit memory control component of claim 1 wherein the metadata cache is implemented within the integrated-circuit memory control component.

3. The integrated-circuit memory control component of claim 1 wherein:
- the host interface comprises circuitry to receive a memory read request and memory address from the host component;
- the memory interface to receive the host data from the one or memory ICs comprises circuitry to output a memory read command to the one or more memory ICs together with the memory address as part of the memory read operation such that the one or memory ICs respond to the memory read command by transmitting the host data to the integrated-circuit memory control component; and
- the control circuitry to retrieve the first metadata value from the metadata cache comprises circuitry to (i) read, from the metadata cache, an entry containing a plurality of metadata fields and (ii) select the first metadata value from one of the metadata fields specified by the memory address.

4. The integrated-circuit memory control component of claim 3 wherein the host data is constituted by a predetermined number of bits that matches a collective number of bits included within the plurality of metadata fields.

5. An integrated circuit memory control component comprising:
- a memory interface to receive host data from one or more memory ICs in a memory read operation;
- control circuitry to recover a first metadata value that corresponds to the host data, including circuitry to:
  - search a metadata cache for the first metadata value,
  - retrieve the first metadata value from the metadata cache in response to a metadata cache hit, and
  - assign a default metadata value to be the first metadata value in response to a metadata cache miss:
- a host interface to output the host data and the first metadata value to a host component after receiving the host data from the one or more memory ICs and recovering the first metadata value; and a programmable register to store a mode value, and wherein the circuitry to assign the default metadata value to be the first metadata value in response to the metadata cache miss comprises circuitry to assign the default metadata value to be the first metadata value if the mode value within the programmable register indicates that the default metadata value is to be inferred to be a metadata value originally received from the host component in association with a request, from the host component, to write the host data to the one or more memory ICs.

6. The integrated-circuit memory control component of claim 5 wherein the control circuitry to recover the first metadata value further comprises circuitry to retrieve the first metadata value from the one or more memory ICs in response to the cache miss if the mode value does not indicate that the default metadata value is to be inferred to be the metadata value originally received from the host component.

7. An integrated-circuit memory control component comprising:

a memory interface to receive host data from one or more memory ICs in a memory read operation:

control circuitry to recover a first metadata value that corresponds to the host data, including circuitry to:

search a metadata cache for the first metadata value, retrieve the first metadata value from the metadata cache in response to a metadata cache hit and assign a default metadata value to be the first metadata value in response to a metadata cache miss; and a host interface to output the host data and the first metadata value to a host component after receiving the host data from the one or more memory ICs and recovering the first metadata value:

wherein:

the host interface comprises circuitry to receive, prior to the memory read operation, the host data and the first metadata value from the host component in association with a memory write request;

the memory interface comprises circuitry to output the host data to the one or more memory ICs in response to the memory write request; and the control circuitry comprises circuitry, responsive to the memory write request, to:

compare the first metadata value with the default metadata value to determine whether the first metadata value matches the default metadata value, and store the first metadata value in an available storage location within the metadata cache only if the first metadata value does not match the default metadata value.

8. The integrated-circuit memory control component of claim 7 further comprising a programmable register to store the default metadata value, and wherein the circuitry to compare the first metadata value with the default metadata value comprises circuitry to compare the first metadata value with the default value stored within the programmable register.

9. The integrated-circuit memory control component of claim 7 wherein the circuitry to store the first metadata value in the available storage location within the metadata cache only if the first metadata value does not match the default metadata value comprises circuitry to store the first metadata value in the available storage location within the metadata cache only if (i) the first metadata value does not match the default metadata value and (ii) an operating mode value is in a predetermined state.

10. A method of operation within a memory control IC (integrated circuit), the method comprising:

reading host data from one or more memory ICs coupled to the memory control IC;

recovering a first metadata value that corresponds to the host data, including:

searching a metadata cache for the first metadata value, retrieving the first metadata value from the metadata cache in response to a metadata cache hit, and assigning a default metadata value to be the first metadata value in response to a metadata cache miss; and after reading the host data from the one or more memory ICs and recovering the first metadata value, outputting the host data and the first metadata value to a host component;

wherein assigning the default metadata value to be the first metadata value comprises obtaining the default metadata value from a programmable register within the memory control IC.

11. The method of claim 10 wherein retrieving the first metadata value from the metadata cache comprises retrieving the first metadata value from a cache memory implemented within the memory control IC.

12. The method of claim 10 further comprising receiving a memory read request and memory address from a host component, and wherein:

reading host data from the one or memory ICs comprises outputting a memory read command to the one or more memory ICs together with the memory address; and retrieving the first metadata value from the metadata cache comprises reading, from the metadata cache, an entry containing a plurality of metadata fields and selecting the first metadata value from one of the metadata fields specified by the memory address.

13. The method of claim 12 wherein the host data is constituted by a predetermined number of bits that matches a collective number of bits included within the plurality of metadata fields.

14. A method of operation within a memory control IC (integrated circuit), the method comprising:

reading host data from one or more memory ICs coupled to the memory control IC;

recovering a first metadata value that corresponds to the host data, including:

searching a metadata cache for the first metadata value, retrieving the first metadata value from the metadata cache in response to a metadata cache hit, and assigning a default metadata value to be the first metadata value in response to a metadata cache miss; and after reading the host data from the one or more memory ICs and recovering the first metadata value, outputting the host data and the first metadata value to a host component;

wherein assigning the default metadata value to be the first metadata value in response to the metadata cache miss comprises assigning the default metadata value to be the first metadata value if a mode value within a programmable register indicates that the default metadata value is to be inferred to be a metadata value originally received from the host component in association with a request, from the host component, to write the host data to the one or more memory ICs.

15. The method of claim 14 further comprising retrieving the first metadata value from the one or more memory ICs in response to the cache miss if the mode value does not indicate that the default metadata value is to be inferred to be the metadata value originally received from the host component.

16. A method of operation within a memory control IC (integrated circuit), the method comprising:

reading host data from one or more memory ICs coupled to the memory control IC:

recovering a first metadata value that corresponds to the host data, including;

searching a metadata cache for the first metadata value, retrieving the first metadata value from the metadata cache in response to a metadata cache hit, and assigning a default metadata value to be the first metadata value in response to a metadata cache miss;

after reading the host data from the one or more memory ICs and recovering the first metadata value, outputting the host data and the first metadata value to a host component; and prior to reading the host data from the one or more memory ICs and prior to recovering the first metadata value, receiving the host data and the first metadata value from the host component in association with a memory write request and, in response to the memory write request:

outputting the host data from the memory control IC to the one or more memory ICs;

comparing the first metadata value with the default metadata value to determine whether the first metadata value matches the default metadata value; and storing the first metadata value in an available storage location within the metadata cache only if the first metadata value does not match the default metadata value.

17. The method of claim 16 wherein comparing the first metadata value with the default metadata value comprises comparing the first metadata value with a default value stored within a programmable register of the memory control IC.

18. The method of claim 16 wherein storing the first metadata value in the available storage location within the metadata cache only if the first metadata value does not match the default metadata value comprises storing the first metadata value in the available storage location within the metadata cache only if (i) the first metadata value does not match the default metadata value and (ii) an operating mode value is in a predetermined state.

* * * * *